(12) United States Patent
Nomura (10) Patent No.: US 7,920,964 B2
(45) Date of Patent: Apr. 5, 2011

(54) NAVIGATION APPARATUS AND NAVIGATION PROCESSING METHOD

(75) Inventor: Takashi Nomura, Zama (JP)

(73) Assignee: Xanavi Informatics Corporation, Zama-shi (JP)

(*) Notice: Subject to any disclaimer, the term of this patent is extended or adjusted under 35 U.S.C. 154(b) by 1229 days.

(21) Appl. No.: 11/508,150

(22) Filed: Aug. 23, 2006

(65) Prior Publication Data

US 2007/0050135 A1 Mar. 1, 2007

(30) Foreign Application Priority Data

Aug. 24, 2005 (JP) ................................. 2005-242331

(51) Int. Cl.
*G01C 21/30* (2006.01)
(52) U.S. Cl. ........ 701/209; 701/200; 701/207; 701/208; 701/210; 701/211; 340/988; 340/990; 340/995.1
(58) Field of Classification Search ........................ None
See application file for complete search history.

(56) References Cited

U.S. PATENT DOCUMENTS

| | | | | | |
|---|---|---|---|---|---|
| 5,712,632 | A * | 1/1998 | Nishimura et al. | ...... | 340/995.19 |
| 6,075,467 | A * | 6/2000 | Ninagawa | ................ | 340/995.14 |
| 6,119,065 | A * | 9/2000 | Shimada et al. | .............. | 701/201 |
| 6,230,098 | B1 * | 5/2001 | Ando et al. | .................... | 701/208 |
| 6,259,990 | B1 * | 7/2001 | Shojima et al. | ................ | 701/209 |
| 6,330,453 | B1 * | 12/2001 | Suzuki et al. | ................ | 455/457 |
| 6,453,233 | B1 * | 9/2002 | Kato | ............................ | 701/208 |
| 6,708,112 | B1 * | 3/2004 | Beesley et al. | ................ | 701/209 |
| 6,823,255 | B2 * | 11/2004 | Ahrens et al. | ................ | 701/200 |
| 6,934,634 | B1 * | 8/2005 | Ge | ................................... | 702/2 |
| 7,388,519 | B1 * | 6/2008 | Kreft | ........................ | 340/995.24 |
| 7,826,965 | B2 * | 11/2010 | Sadri et al. | .................... | 701/200 |
| 7,831,381 | B2 * | 11/2010 | Thota | ............................ | 701/208 |
| 2001/0027375 | A1 * | 10/2001 | Machida et al. | ............. | 701/209 |
| 2002/0091485 | A1 * | 7/2002 | Mikuriya et al. | ............. | 701/208 |
| 2002/0188399 | A1 * | 12/2002 | Odagawa et al. | ............. | 701/202 |

(Continued)

FOREIGN PATENT DOCUMENTS

JP 9-180089 A 7/1997

(Continued)

OTHER PUBLICATIONS

European Search Report dated Dec. 18, 2006 (Seven (7) pages).

(Continued)

*Primary Examiner* — Khoi Tran
*Assistant Examiner* — Jonathan L Sample
(74) *Attorney, Agent, or Firm* — Crowell & Moring LLP (57) ABSTRACT

A navigation apparatus includes: a map data obtaining unit that obtains map data; a navigation processing unit that executes navigation processing by using the obtained map data; a search data obtaining unit that obtains search data; a specific data detection unit that detects specific data for a specified search target by using the obtained search data; a correspondence table obtaining unit that obtains a correspondence table indicating correspondence between identification information used to identify individual road units into which each road is divided in predetermined units and map data road unit information related to map data road units defined in the map data individually corresponding to the road units; and a map position determining unit that determines a position of the specified search target in the map data based upon the specific data for the specified search target having been detected and the correspondence table having been obtained.

10 Claims, 9 Drawing Sheets

U.S. PATENT DOCUMENTS

| | | | |
|---|---|---|---|
| 2003/0195700 A1* | 10/2003 | Hamada et al. | 701/208 |
| 2004/0008225 A1* | 1/2004 | Campbell | 345/764 |
| 2004/0064245 A1* | 4/2004 | Knockeart et al. | 701/117 |
| 2004/0088110 A1* | 5/2004 | Suzuki | 701/211 |
| 2004/0117110 A1* | 6/2004 | Sasajima | 701/208 |
| 2004/0133344 A1* | 7/2004 | Hashida et al. | 701/208 |
| 2005/0027447 A1* | 2/2005 | Hirose et al. | 701/210 |
| 2005/0140524 A1* | 6/2005 | Kato et al. | 340/995.13 |
| 2005/0203698 A1* | 9/2005 | Lee | 701/200 |
| 2006/0064243 A1* | 3/2006 | Hirose | 701/211 |
| 2006/0074547 A1* | 4/2006 | Kaufman et al. | 701/200 |
| 2006/0080030 A1* | 4/2006 | Okude et al. | 701/208 |
| 2006/0173614 A1* | 8/2006 | Nomura | 701/210 |
| 2006/0265294 A1* | 11/2006 | de Sylva | 705/28 |
| 2008/0228712 A1 | 9/2008 | Nomura | |

FOREIGN PATENT DOCUMENTS

| | | |
|---|---|---|
| JP | 2001-56823 A | 2/2001 |
| JP | 2003-308010 A | 10/2003 |
| WO | WO 2004/008172 A1 | 1/2004 |
| WO | WO 2005/069147 A1 | 7/2005 |

OTHER PUBLICATIONS

Japanese Office Action dated Dec. 7, 2010 with English translation (five (5) pages).

* cited by examiner

| | 31 | 32 | 33 | 34 | 35 | 36 | 37 | 38 | 39 |
|---|---|---|---|---|---|---|---|---|---|
| RECORD 001 | POI NAME 001 | NAME PHONETIC | CATEGORY | STREET ADDRESS (HOUSE NO.) | MESH CODE | LINK INFORMATION | HOUSE NO. RANGE | ROAD SHAPE ELEMENT INHERENT NUMBER | THREE-POINT COORDINATES |
| RECORD 002 | POI NAME 002 | NAME PHONETIC | CATEGORY | STREET ADDRESS (HOUSE NO.) | MESH CODE | LINK INFORMATION | HOUSE NO. RANGE | ROAD SHAPE ELEMENT INHERENT NUMBER | THREE-POINT COORDINATES |
| RECORD 003 | POI NAME 003 | NAME PHONETIC | CATEGORY | STREET ADDRESS (HOUSE NO.) | MESH CODE | LINK INFORMATION | HOUSE NO. RANGE | ROAD SHAPE ELEMENT INHERENT NUMBER | THREE-POINT COORDINATES |
| .. | | | | | | | | | |
| RECORD n | POI NAME n | NAME PHONETIC | CATEGORY | STREET ADDRESS (HOUSE NO.) | MESH CODE | LINK INFORMATION | HOUSE NO. RANGE | ROAD SHAPE ELEMENT INHERENT NUMBER | THREE-POINT COORDINATES |

FIG.5

| | 41 | 42 | 43 | 44 | 45 | 46 | 47 |
|---|---|---|---|---|---|---|---|
| RECORD 001 | STREET NAME 001 | AREA INFORMATION | MESH CODE | LINK INFORMATION | HOUSE NO. RANGE | ROAD SHAPE ELEMENT INHERENT NUMBER | THREE-POINT COORDINATES |
| RECORD 002 | STREET NAME 002 | AREA INFORMATION | MESH CODE | LINK INFORMATION | HOUSE NO. RANGE | ROAD SHAPE ELEMENT INHERENT NUMBER | THREE-POINT COORDINATES |
| RECORD 003 | STREET NAME 003 | AREA INFORMATION | MESH CODE | LINK INFORMATION | HOUSE NO. RANGE | ROAD SHAPE ELEMENT INHERENT NUMBER | THREE-POINT COORDINATES |
| ∶ | | | | | | | |
| RECORD n | STREET NAME n | AREA INFORMATION | MESH CODE | LINK INFORMATION | HOUSE NO. RANGE | ROAD SHAPE ELEMENT INHERENT NUMBER | THREE-POINT COORDINATES |

FIG.6

| | 51 | 52 | 53 |
|---|---|---|---|
| RECORD 001 | ROAD SHAPE ELEMENT INHERENT NUMBER 001 | MESH CODE | LINK INFORMATION |
| RECORD 002 | ROAD SHAPE ELEMENT INHERENT NUMBER 002 | MESH CODE | LINK INFORMATION |
| RECORD 003 | ROAD SHAPE ELEMENT INHERENT NUMBER 003 | MESH CODE | LINK INFORMATION |
| : | | | |
| RECORD m | ROAD SHAPE ELEMENT INHERENT NUMBER m | MESH CODE | LINK INFORMATION |

NAVIGATION APPARATUS AND NAVIGATION PROCESSING METHOD

INCORPORATION BY REFERENCE

The disclosures of the following priority application are herein incorporated by reference:

Japanese Patent Application No. 2005-242331 filed Aug. 24, 2005

BACKGROUND OF THE INVENTION

1. Field of the Invention

The present invention relates to a navigation apparatus and a navigation processing method.

2. Description of Related Art

There is a technology adopted in a car navigation apparatus in the known art, whereby a map is divided into a plurality of units, map data files are created each in correspondence to one of the units and the map data files are updated in correspondence to the individual units (see Japanese Laid Open Patent Publication No. 2001-56823).

SUMMARY OF THE INVENTION

The technology disclosed in Japanese Laid Open Patent Publication No. 2001-56823 relates to a map data update and does not apply to an update of search data used in the navigation apparatus. Accordingly, there is a great need for a method that establishes with efficiency and reliability correspondence between map data and search data so as to facilitate the update of the map data and the search data.

The present invention provides a navigation apparatus and a navigation processing method that establish the correspondence between map data and search data efficiently and reliably.

According to the 1st aspect of the present invention, a navigation apparatus comprises: a map data obtaining unit that obtains map data; a navigation processing unit that executes navigation processing by using the map data having been obtained; a search data obtaining unit that obtains search data; a specific data detection unit that detects specific data for a specified search target by using the search data having been obtained; a correspondence table obtaining unit that obtains a correspondence table indicating correspondence between identification information used to identify individual road units into which each road is divided in predetermined units and map data road unit information related to map data road units defined in the map data individually corresponding to the road units; and a map position determining unit that determines a position of the specified search target in the map data based upon the specific data for the specified search target having been detected and the correspondence table having been obtained.

According to the 2nd aspect of the present invention, in the navigation apparatus according to the 1st aspect, it is preferred that: the specific data corresponding to each of various search targets, which are included in the search data, contain identification information used to identify a road unit at which the search target is located; and the map position determining unit obtains the map data road unit information from the correspondence table having been obtained, which corresponds to the identification information contained in the specific data for the specified search target having been detected and identifies the map data road unit in the map data based upon the map data road unit information having been obtained.

According to the 3rd aspect of the present invention, in the navigation apparatus according to the 1st aspect, it is preferred that: the specific data for each of various search targets, which are included in the search data, contain information related to positions of at least a start point and an end point of the map data road unit corresponding to the road unit, in addition to the identification information; and the map position determining unit also determines the directionality of the map data road unit in the map data by using the information related to the positions of at least the start point and the end point contained in the specific data for the specified search target having been detected.

According to the 4th aspect of the present invention, a navigation processing method comprises: obtaining search data; obtaining map data; and establishing a correspondence between the search data and the map data by using identification information used to identify individual road units into which each road is divided in predetermined units.

According to the 5th aspect of the present invention, a computer-readable data product comprises a recording medium in which there are recorded the search data, the map data and the correspondence table obtained by a navigation apparatus according to the 1st aspect.

BRIEF DESCRIPTION OF THE DRAWINGS

FIG. 10 shows how the program may be provided to a personal computer in a recording medium such as a CD-ROM or via a data signal on the Internet or the like.

DESCRIPTION OF PREFERRED EMBODIMENT(S)

Figure 1:
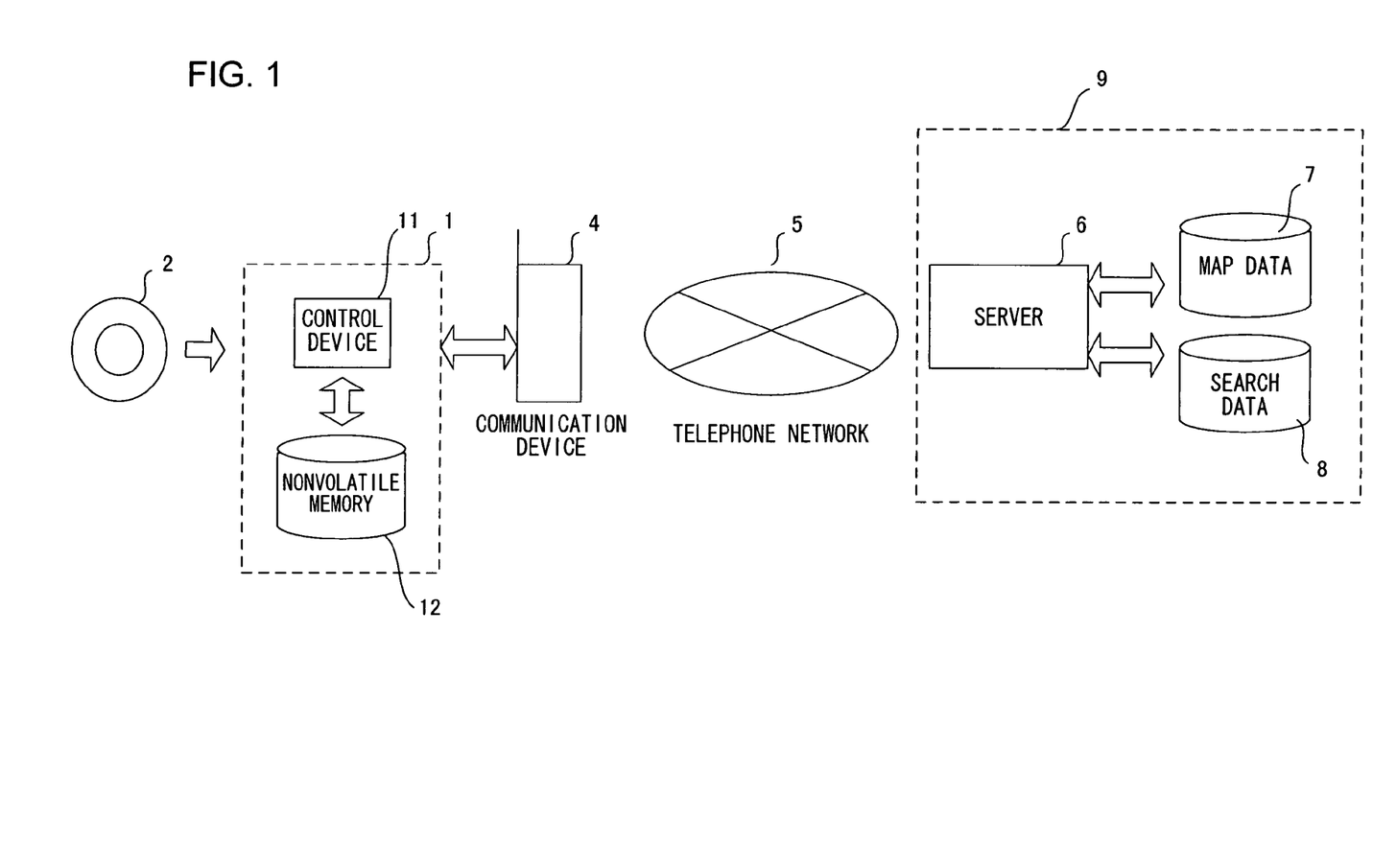
FIG. 1 shows a search data update system adopted to update search data used in a navigation apparatus, as achieved in an embodiment of the present invention.

FIG. 1 shows an update system with which search data used in a navigation apparatus are updated, as achieved in an embodiment of the present invention. An on-vehicle navigation apparatus 1 reads map data, search data (guidance search data) and the like from a recording medium 2 such as a CD-ROM or a DVD-ROM. A server 6 at a data provider center 9 reads map data and search data respectively from a map database 7 and a search database 8 and provides update data to be used to update map data and search data to the navigation apparatus.

The navigation apparatus 1 in the embodiment updates search data by ensuring that the updated search data maintain optimal correspondence with the relevant map data.

The navigation apparatus 1 is able to connect with a communication device 4 such as a portable telephone. The navigation apparatus 1 is also able to connect with a telephone network 5 via the communication device 4 and then connect with the server 6 via the telephone network 5. The server 6 saves in the map database 7 map data including older versions of map data and the latest version of map data and also saves in the search database 8 search data including older versions of search data and the latest version of search data. Thus, the server 6 is able to provide the navigation apparatus 1 with update data to be used to update part of the map data or the search data via the telephone network 5.

The navigation apparatus 1 includes a control device 11 and a nonvolatile memory 12. The control device 11 is constituted with a microprocessor and its peripheral circuits. The nonvolatile memory 12 is a hard disk or a flash memory built into the navigation apparatus 1. The nonvolatile memory 12 may be any type of storage device as long as data written therein are not lost when the power to the navigation apparatus 1 is turned off.

The map database 7 and the search database 8 at the data provider center 9, which hold all the versions of map data and search data to date, are mother databases. Data at the map database 7 or the search database 8 may be used by the server 6 to prepare the recording medium 2 having recorded therein the initial (pre-update) map data or search data.

Figure 2:
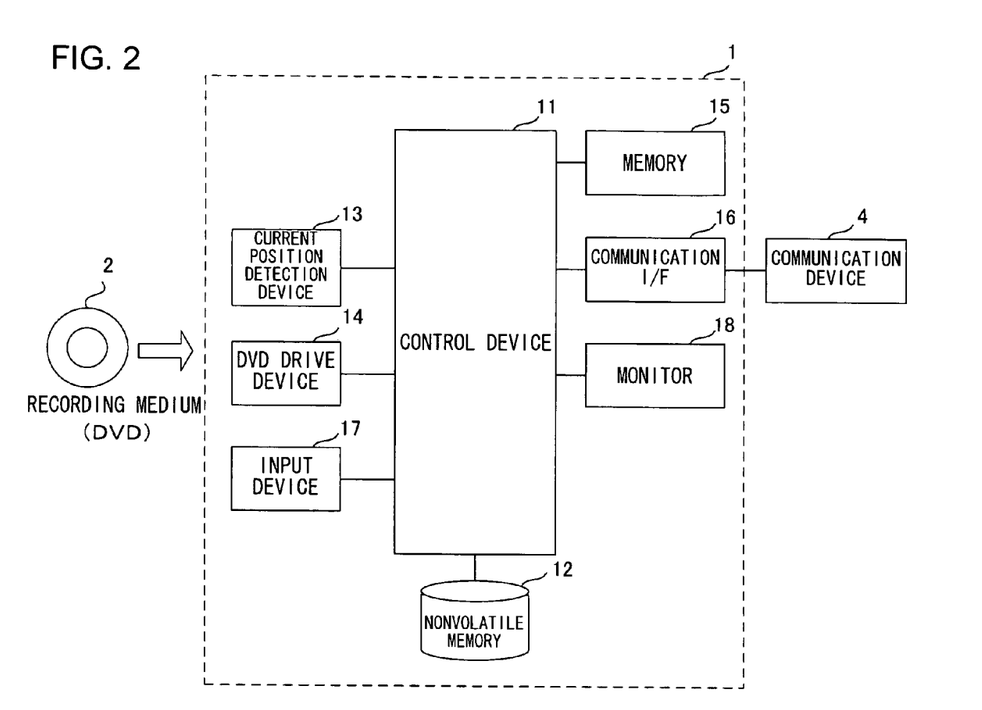
FIG. 2 shows a block diagram of the on-vehicle navigation apparatus 1.

FIG. 2 is a block diagram of the on-vehicle navigation apparatus 1. The navigation apparatus 1 comprises the control device 11, the nonvolatile memory 12, a current position detection device 13, a DVD drive device 14, a memory 15, a communication interface 16, an input device 17, a monitor 18 and the like.

The current position detection device 13, which detects the current position of the vehicle, may be constituted with an azimuth sensor that detects the advancing azimuth of the vehicle, a vehicle speed sensor that detects the vehicle speed, a GPS sensor that detects a GPS signal from a GPS (Global Positioning System) satellite and the like. The DVD drive device 14 reads map data and the like from a recording medium 2 loaded therein. The recording medium 2 in the embodiment is a DVD-ROM. However, it may be another type of recording medium such as a CD-ROM.

In the memory 15, vehicle position information indicating the vehicle position detected by the current position detection device 13, node information and link information with regard to the nodes and the links present on a recommended route calculated by the control device 11, and the like are stored. The memory 15 is used as a working area by the control device 11. The communication interface 16 is an interface that connects the navigation apparatus with the communication device 4. The use of the portable telephone and the connection with the Internet are enabled via the communication interface 16.

At the monitor 18, a map, the recommended route and various types of information are displayed. The monitor 18 may be provided as an integrated part of the navigation apparatus main unit or it may be provided as a stand-alone unit in a separate casing. In addition, the monitor 18 alone may be installed at a remote location and connected with the navigation apparatus via a cable or the like. The input device 17 is used to input a destination for the vehicle and the like for a route search. It is also used to enter a search key. The input device may be a remote-control unit or it may be constituted with a touch panel disposed on the screen of the monitor 18.

The control device 11 executes various types of navigation processing such as road map display, route calculation (route search) and route guidance by using the current vehicle position information detected with the current position detection device 13, the map data and the search data stored in the recording medium 2 or the nonvolatile memory 12 and the like. It is to be noted that a program of the various types of processing executed by the control device 11 is installed in a ROM (not shown) provided inside the control device 11.

The server 6 at the data provider center 9 is a computer system that executes various types of processing including update data distribution, by using the data in the map database 7 and the search database 8. The computer system at the server 6 may be constituted with any type of computer, e.g., a general-purpose computer, a workstation or a personal computer.

The map data and the search data used in the navigation apparatus 1 are now explained.

—Map Data—

The map data are information related to maps and include background (map display) data, road (locator) data, route search data (network data) and route guidance data (information indicating intersection names, road names and directional terms, directional guidance facility information and the like). The background data are used to display a background of a road or a background in a road map. The road data are used to specify the current vehicle position on a road for map matching and the like. The route search data, which are data constituted with branching information and the like not directly relevant to the specific road shapes, are mainly used when calculating a recommended route (when executing a route search). The route guidance data include the names of intersections and the like, and are used to provide guidance for the driver or the like along the recommended route having been calculated.

The road data (locator data) are link string data that express roads with links, nodes and link strings. The term "node" is used to refer to an intersection or a special point specified on a road. A link is equivalent to a road connecting nodes, which may be regarded as a road unit defined in the road data, whereas a link string is a string of a plurality of links representing a single road. The details of the link string data are of the known art. The background data may be, for instance, polygon or poly line data. Roads are displayed by using poly-line data or the like. It is to be noted that roads may be displayed by using the road data. In the following description, the term "map data" is used to specifically refer to road data that express each road as a set of links, as explained above, as a typical example of map data.

—Search Data—

The search data are used to specify a desired geographical point through a search executed based upon information entered through a key input, instead of specifying the desired geographical point on the map. For instance, a destination for a route search may be set by entering the name, the street address or the telephone number of a POI (point of interest) and in such a case, the position of the POI can be determined based upon the search data. The control device 11 sets the geographical point determined by using the search data as, for instance, a destination and executes processing such as route search.

The search data include various types of data such as name (phonetic) search data, street address search data and telephone number search data. As the name search data, used to specify a position on the map in correspondence to a POI (facility) name, data files are prepared each in correspondence to a specific area in a given category. The name search data categories may include, for instance, "train stations", "airports", "ferries", "department stores", "hotels", "gas stations", "ski resorts" and "golf courses".

Each file contains search tree data that enable name-based search and substance data. It is to be noted that while a POI may be considered to be a target facility, the term "POI" may be used to refer to a search target other than a facility such as a building. It may be a geographical point such as a ski resort, a golf course or a tourist spot. The name search data may also be referred to as POI search data.

As the street address search data, used to specify a position on the map in correspondence to a street address, data files are prepared each in correspondence to a specific area. Each file contains search tree data that enable street address-based search and substance data.

As the telephone number search data, used to specify a position on the map in correspondence to a telephone number, data files are prepared each in correspondence to a specific combination of numbers assigned to the first two digits of an area code. Each file contains search tree data that enable telephone number-based search and substance data.

The search tree data included in the various types of search data described above are used to narrow down the search range and are also referred to as search frame data. The substance data include name information indicating the names of individual POIs, telephone number information or street address information depending upon the type of search data, position information and the like. The position information in the search data is constituted with positional coordinate data indicating the positional coordinates determined based upon the latitude/longitude or the like of the particular geographical point. It is to be noted that common substance data may be held as part of various types of search data.

It is to be noted that the navigation apparatus 1 achieved in the embodiment operates on the premise that street addresses are indicated in the Western system, i.e., the house number system. In the house number system, the street address is indicated through a combination of the street name and the house number. House numbers are assigned in a predetermined order to houses and facilities on each street. Houses and facilities on one side of the street may be assigned with even numbers and those on the other side may be assigned with odd numbers. Thus, once the street name and the house number are ascertained, the target house or facility can be identified.

—Relationship Among Search Data, Map Data and Inherent Number Correspondence Table—

Figure 3:
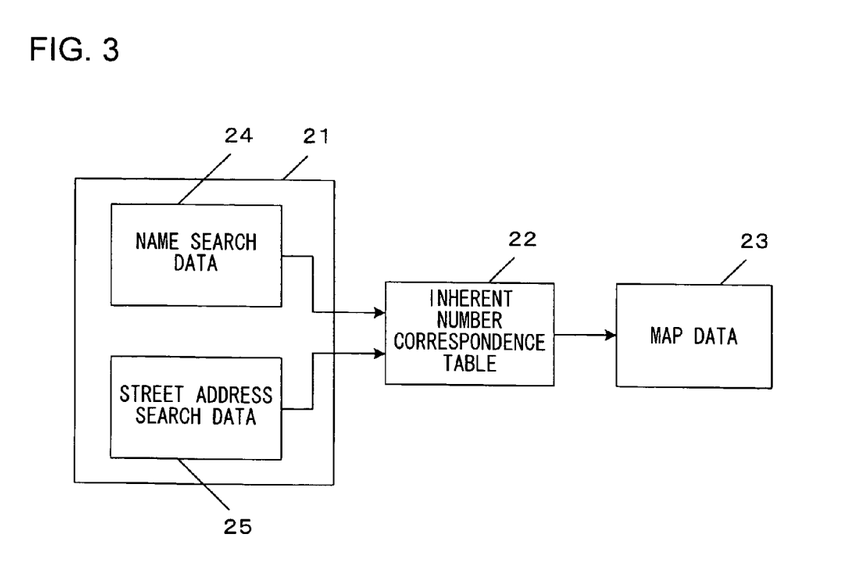
FIG. 3 shows the relationship among the search data 21, the inherent number correspondence table 22 and the map data 23.

FIG. 3 illustrates the relationship among search data 21, an inherent number correspondence table 22 and map data 23. The search data 21 in FIG. 3 include name search data 24 and street address search data 25. The embodiment is characterized in that the correspondence between the search data 21 and the map data 23 is maintained by referencing the inherent number correspondence table 22.

Figure 4:
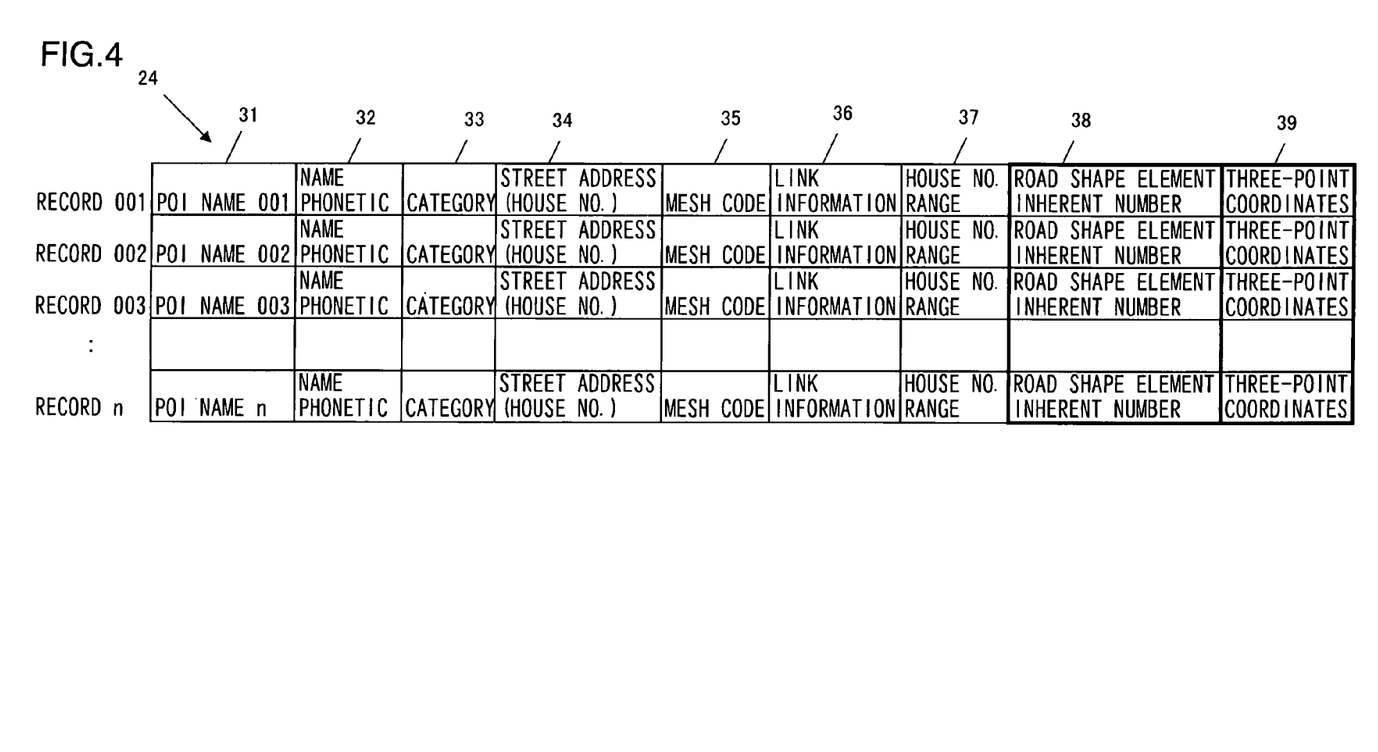
FIG. 4 shows the data structure adopted in the substance data constituting part of the name search data 24.

FIG. 4 shows the data structure of the substance data in the name search data 24. The name search data 24 are constituted with a plurality of records each holding data corresponding to a given POI. In the example presented in FIG. 4, the substance data in the name search data 24 are constituted with n records, holding therein specific data for n POIs.

Each of the records constituting the substance data in the name search data 24 contains therein data indicating a POI name 31, name phonetic 32, a category 33, a street address (house number) 34, a mesh-code 35, link information 36, a house number range 37, a road shape element inherent number 38, three-point coordinates 39 and the like.

As the POI name 31, data indicating the POI name are stored. As the name phonetic 32, data indicating the phonetic of the POI name are stored. As the category 33, data indicating the category of the particular POI are stored. As the street address (house number) 34, data indicating the house number of the POI are stored. The house number is assigned to the POI by adopting the Western street address system explained earlier. As the mesh code 35, data indicating the mesh code of the mesh containing the POI are stored. In the embodiment, the map data are divided into a plurality of meshes and are stored in units of the individual meshes. Mesh codes are assigned so as to enable identification of the individual meshes into which the map data are divided and are constituted with, for instance, data indicating the latitude/longitude of the individual meshes.

As the link information 36, information related to the link corresponding to the road portion where the POI is located is stored. The link-related information directly indicates the physical position of the link in the map data (recording medium). It is to be noted that the term "link" is used in this context to refer to a link corresponding to the road shape element indicated by the road shape element inherent number 38 and thus, it may actually refer to a plurality of links. In more specific terms, the link-related information is offset data that indicate the storage location at which coordinate data for each node constituting the link are stored in the recording medium 2.

As the house number range 37, data indicating the range of house numbers present along the link are stored. As the road shape element inherent number 38, data indicating the road shape element inherent number, to be detailed later, corresponding to the road shape element on which the POI is located, are stored. As the three-point coordinates 39, normalized coordinate data for a start point, a middle point and an end point of the link indicated by the link information 36 are stored.

Figure 5:
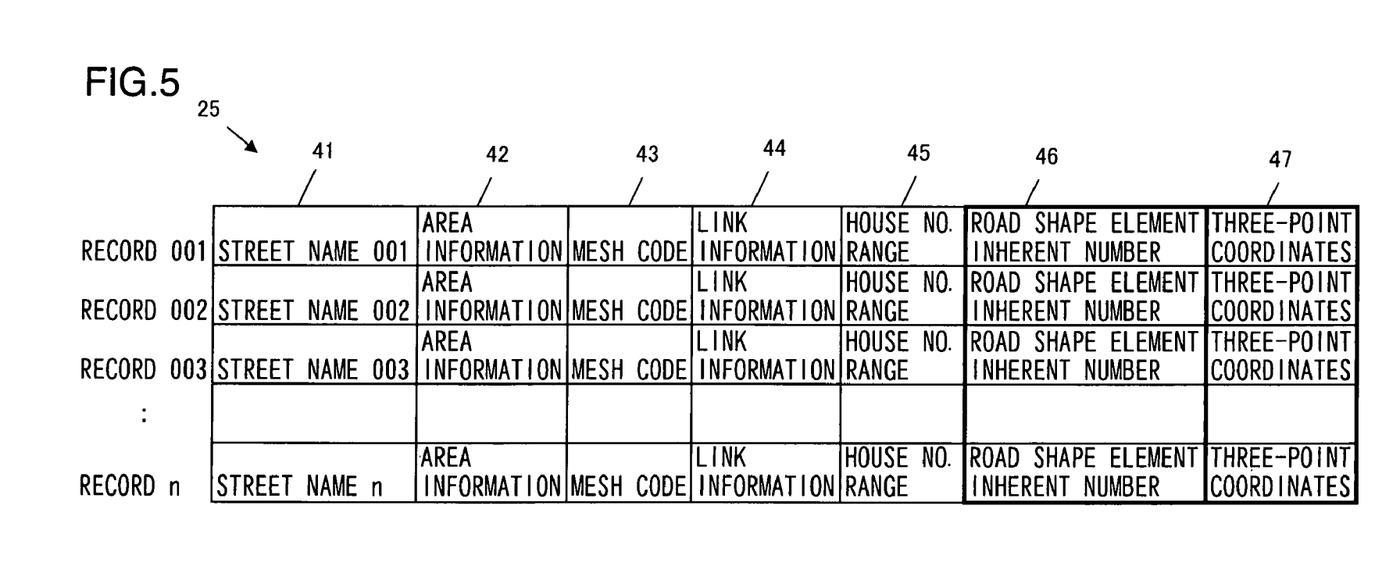
FIG. 5 shows the data structure adopted in the substance data constituting part of the street address search data 25.

FIG. 5 shows the data structure of the substance data in the street address search data 25. The street address search data 25 are constituted with a plurality of records each holding data corresponding to a specific road shape element indicated by a road shape element inherent number 46. In the example presented in FIG. 5, the substance data in the street address search data 25 are constituted with n records, holding therein specific data for n road shape elements.

Each of the records constituting the substance data in the street address search data 25 contains data indicating a street name 41, area information 42, a mesh code 43, link information 44, a house number range 45, a road shape element inherent number 46, three-point coordinates 47 and the like. In the embodiment, a geographical point is specified in correspondence to a street address based upon the area name, the street name and the house number, as explained earlier.

As the street name 41, data indicating the name of the street address that contains the road shape element indicated by the road shape element inherent number 46 are stored. As the area information 42, data indicating the name of the area, which the road shape element corresponding to the road shape element inherent number 46, are stored. As the mesh code 43, mesh code data corresponding to the mesh, which contains the road shape element corresponding to the road shape element inherent number 46, are stored.

As the link information 44, information related to the link corresponding to the road shape element indicated by the road shape element inherent number 46 is stored. The link-related information directly indicates the physical position of the link in the map data (recording medium). It is to be noted that the term "link" is used in this context to refer to a link corresponding to the road shape element indicated by the road shape element inherent number 46 and thus, it may actually refer to a plurality of links. In more specific terms, the link-related information is offset data that indicates the storage location at which coordinate data for each node constituting the link are stored in the recording medium 2.

As the house number range 45, data indicating the range of house numbers present along the link are stored. As the road shape element inherent number 46, the inherent number assigned to the particular road shape element is stored. As the three-point coordinates 47, normalized coordinate data for a start point, a middle point and an end point of the link indicated by the link information 44 are stored.

Since a given street is normally constituted with a plurality of road shape elements, different records in the street address search data 25 may contain identical street name data 41 indicating a single name. However, the records, with identical street name data 41 indicating the same name, hold house number range data 45 indicating different ranges from each other. Accordingly, once the street name and the house number are specified, one of the records in the street address search data 25 can be specified.

Figure 6:
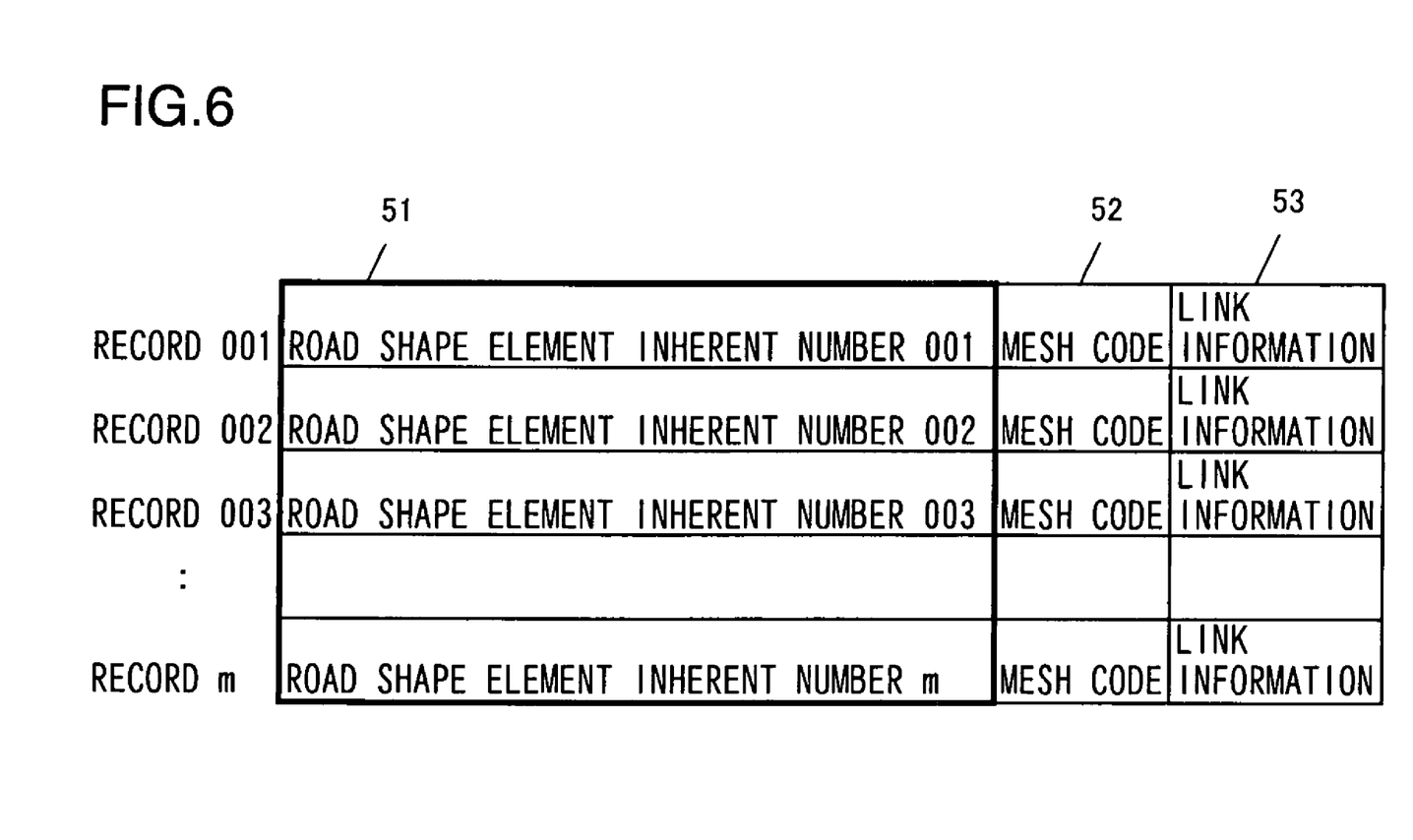
FIG. 6 shows the data structure adopted in the inherent number correspondence table 22.

FIG. 6 shows the data structure adopted in the inherent number correspondence table 22. The inherent number correspondence table 22 is constituted with a plurality of records each holding data indicating a road shape element inherent number 51, a corresponding mesh code 52 and link information 53. In the example presented in FIG. 6, the inherent number correspondence table 22 contains m records with m road shape element inherent numbers.

The road shape element inherent number 51 is to be described in detail later. As the mesh code 52, mesh code data for the mesh containing the road shape element indicated in the road shape element inherent number 51 are stored. As the link information 53, information related to the link corresponding to the road shape element indicated in the road shape element number 51 is stored. The link-related information directly indicates the physical position of the link in the map data (recording medium). In more specific terms, the link-related information is offset data that indicates the storage location at which coordinate data for each node constituting the link are stored in the recording medium 2.

Next, the road shape element inherent numbers indicated by the road shape element inherent number data 38, 46 and 51 are explained. The road shape inherent numbers are assigned to individual road portions into which each road is divided so as to enable identification of each road portion. Each road shape element inherent number constitutes information used to identify an actual road and a road portion is never assigned with more than one road shape element inherent number. The road shape inherent numbers may also be used to identify the actual roads in the databases when generating map data and search data. They may be a 10-digit BCD code assigned with sequence numbers. This means that 5-byte data must be allocated to each road shape element inherent number. If the road shape element inherent number data are processed in units of words, each road shape element inherent number must be allocated with 3 words/6 bytes with the last one byte reserved as an auxiliary bite.

The predetermined units into which each road is divided are referred to as road shape elements or simply road units in the description of the embodiment. The road may be divided in correspondence to predetermined units by, for instance, dividing it into road sections at intersections used as cutoff points. Accordingly, a road shape element basically has a one-to-one correspondence with a link defined in the map data. However, a link in the map data does not always have a strict correspondence to a road section extending between intersections, and the road section between intersections may sometimes be represented by a plurality of links. In addition, a road shape element may not always correspond to a road segment between two successive intersections. In other words, the road shape elements and the links in the map data may not always maintain a one-to-one correspondence. An explanation is given in reference to the embodiment by assuming that a given road shape element corresponds to at least one link.

In the map data, link IDs may be assigned to the links. However, the map data may include data at varying levels each corresponding to a specific scaling factor. In such a case, a given road may be assigned with different link IDs at different data levels. The road shape element inherent numbers in the embodiment, on the other hand, are IDs assigned to the actual road portions, and thus, a given road portion (road shape element) is assigned with a single road shape element inherent number. In this aspect, the road shape element inherent numbers are different from link IDs.

In the embodiment, the road shape element inherent numbers inherent to the individual road shape elements, which are universal numbers defined as described above, are used so as to sustain an efficient and accurate correspondence between the search data 21 and the map data 23 even after the search data 21 are updated.

—Search Processing—

Figure 7:
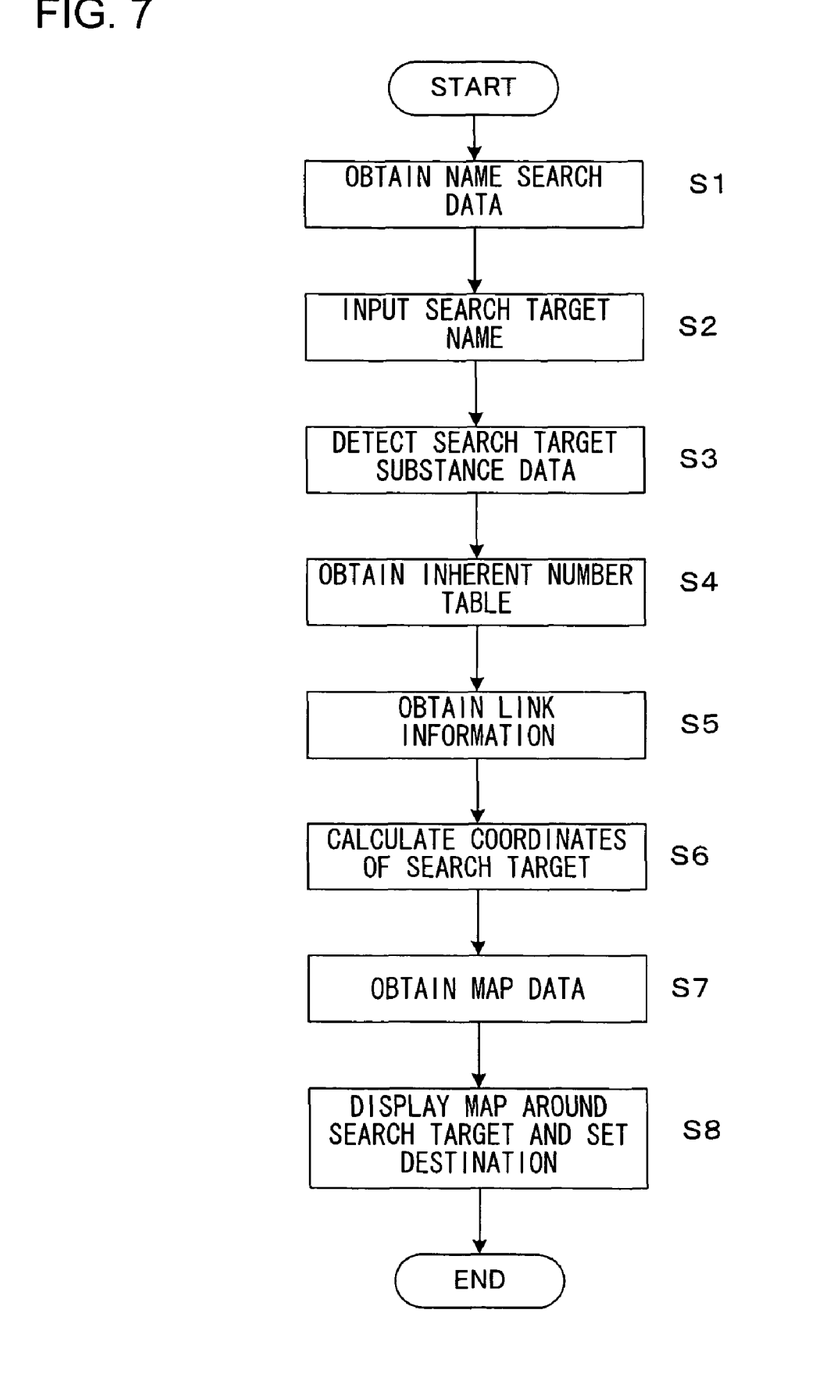
FIG. 7 shows a flowchart of the search processing executed in the navigation apparatus 1.

FIG. 7 presents a flowchart of the search processing executed in the navigation apparatus 1. The processing in FIG. 7 is executed on name search data. As the user enters the name of a search target POI via the input device 17, a search for the POI name matching the entered characters is executed. It is to be noted that the processing flow in FIG. 7 starts as the option "from name" is selected to set a destination in a menu screen at the navigation apparatus. The processing in FIG. 7 is executed by the control device 11.

In step S1, the name search data 24 are obtained from the recording medium 2. Assuming that the target category and the target area, too, have been specified, the corresponding name search data files are read from the recording medium 2. In step S2, the user enters the name of the search target POI via the input device 17.

In step S3, the name search data 24 are searched based upon the POI name having been entered and the substance data for the matching POI are detected. The search is executed by using the search tree data stored as part of the name search data 24. In step S4, the inherent number correspondence table 22 is obtained from the recording medium 2.

In step S5, the road shape element inherent number is obtained from the substance data for the search target having been detected in step S3 and, based upon the road shape element inherent number having been obtained, the inherent number correspondence table 22 is referenced to obtain the corresponding mesh code and link information. A specific map data file is identified in correspondence to the mesh code and based upon the link information, the position (offset) in the recording medium 2 at which the coordinate data for each of the nodes present in the corresponding link are stored, is ascertained.

In step S6, the recording medium 2 is accessed and the coordinate data for the nodes in the target link are obtained based upon the mesh code and the link information having been obtained as described earlier. If there is only one corresponding link, the coordinate data for the nodes present at the two ends of the link are retrieved from the link string data. If there is a plurality of corresponding links, the coordinate data for a plurality of nodes constituting the plurality of corresponding links are sequentially obtained from the link string data.

The position of the POI is then determined by using the node coordinate data obtained as described above, and the street address (house number) 34 and the house number range 37 indicated in the search target substance data having been detected in step S3. Namely, the coordinates of the POI position are calculated. For instance, since the house number range and the house number itself are known, the range from the link start point to the link end point may be divided by the number of house numbers contained in the house number range and the specific position within the house number, which corresponds to the house number, may be ascertained. In other words, the position (coordinates) of the search target can be determined through a proportional calculation.

In step S7, map data of an area around the POI position having been determined in step S6 are obtained. In step S8, the roadmap of the area around the POI position, which contains a mark pointing to the POI position, is brought up on display at the monitor 18 based upon the POI position having been determined in step S6, and the POI position (the geographical point) is set as the destination. It is to be noted that before setting the POI position as the destination, the user may be consulted as to whether or not the POI position determined through the arithmetic operation should be set as the destination.

It is to be noted that the directionality of the links in the name search data 24 and the directionality of the links in the inherent number correspondence table 22 need to match when the coordinates of the POI position are calculated in step S6. For instance, the data arrangement in link string data representing a given road may need to be reversed for an update when updating the map data 23. Namely, the link string start point and the link string end point may need to be reversed. Under such circumstances, even if the corresponding link is successfully identified in step S6, the POI position may be calculated erroneously in correspondence to the house number since the link string start point and the link string end point are reversed.

The three-point coordinate data mentioned earlier, stored as part of the search data 21, are used to eliminate this problem in the embodiment. FIG. 8 illustrates consistent link information arrangement coordination is sustained.

Figure 8A:
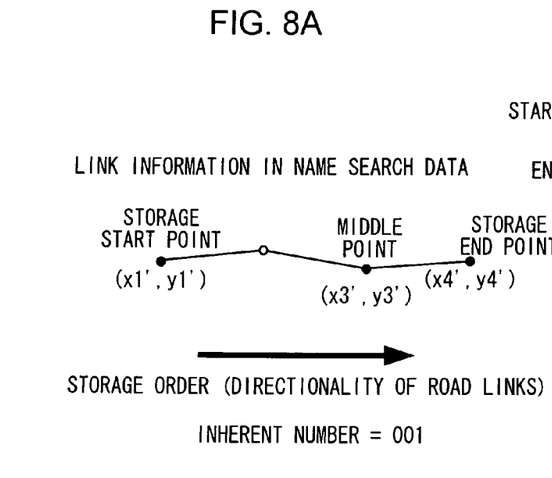
FIG. 8 shows an illustration provided to facilitate an explanation on how the link information sequences should be coordinated.

FIG. 8 shows an example in which the road shape element indicated by a road shape element inherent number 001 in the name search data 24, at which a given POI is located, is constituted with three links. FIG. 8A shows that "001" is stored as the road shape element inherent number 38 for a record 001 in the name search data 24, and that coordinate data (x1', y1'), (x3', y3') and (x4', y4') are stored as the three-point coordinates 39 to respectively indicate the coordinates of the storage start point, the storage middle point and the storage end point.

Figure 8B:
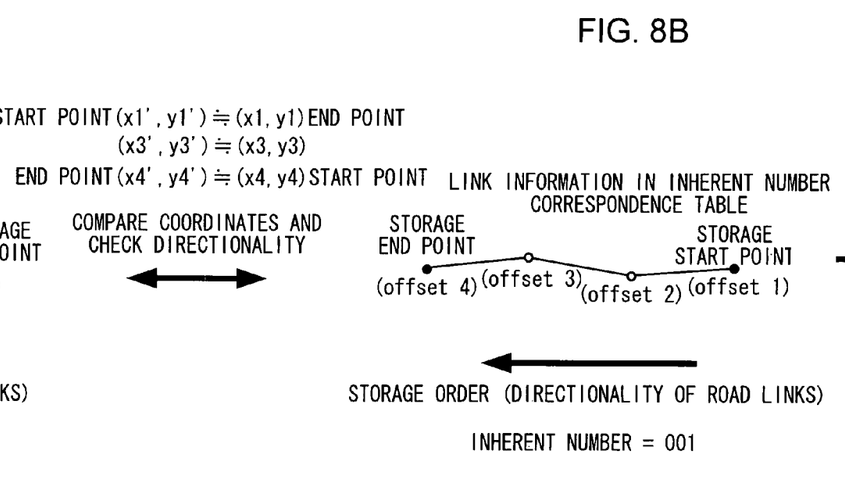
Figure 8C:
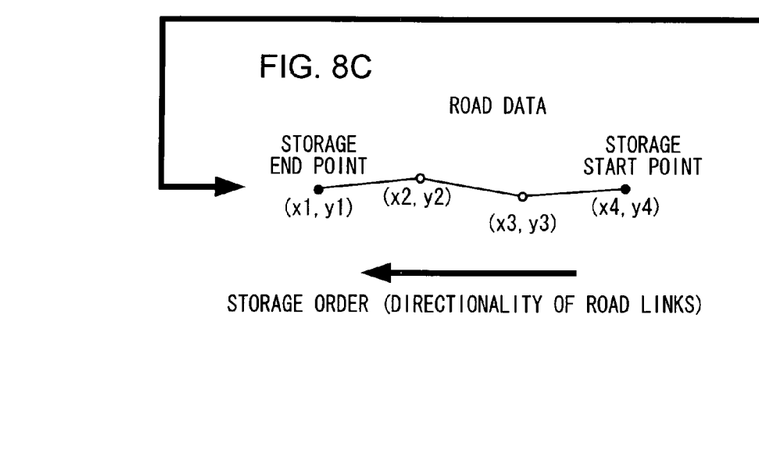

FIG. 8B shows that a storage start point offset 1, offset 2, offset 3 and a storage end point offset 4 are stored in the link information 53 corresponding to the road shape element inherent number 001 in the record 001 at the inherent number correspondence table 22. FIG. 8C shows that the coordinates; offset 1=(x4, y4), offset 2=(x3, y3), offset 3=(x2, y2) and offset 4=(x1, y1) are stored in the map data corresponding to the link information 53 at the inherent number correspondence table 22.

By comparing the three-point coordinates 39 (x1', y1') (x3', y3') and (x4', y4') extracted from the search target substance data having been detected in step S3 with the coordinates (x4, y4), (x3, y3), (x2, y2) and (x1, y1) having been read out with the offset in the link information 53 at the inherent number correspondence table 22, it can be judged that (x1', y1')≈(x1, y1), (x3', y3')≈(x3, y3) and (x4', y4')≈(x4, y4). The symbol ≈ is used since the map data update may have resulted in a slight shift in the coordinate values but they can still be regarded to indicate the identical coordinate points as long as the coordinate values substantially match.

Through this check, the links can be judged to be the same links since the coordinate values at the three points match. However, the check results also indicate that the start point and the end point are reversed, i.e., the link direction has been reversed. Accordingly, the data arrangement is reversed and the POI position is determined through an arithmetic operation based upon the house number by using the reversed data. As a result, even when the link direction, i.e., the data arrangement, has been reversed, the POI position can be calculated correctly by taking into consideration the link direction reversal.

—Updating Search Data—

Figure 9:
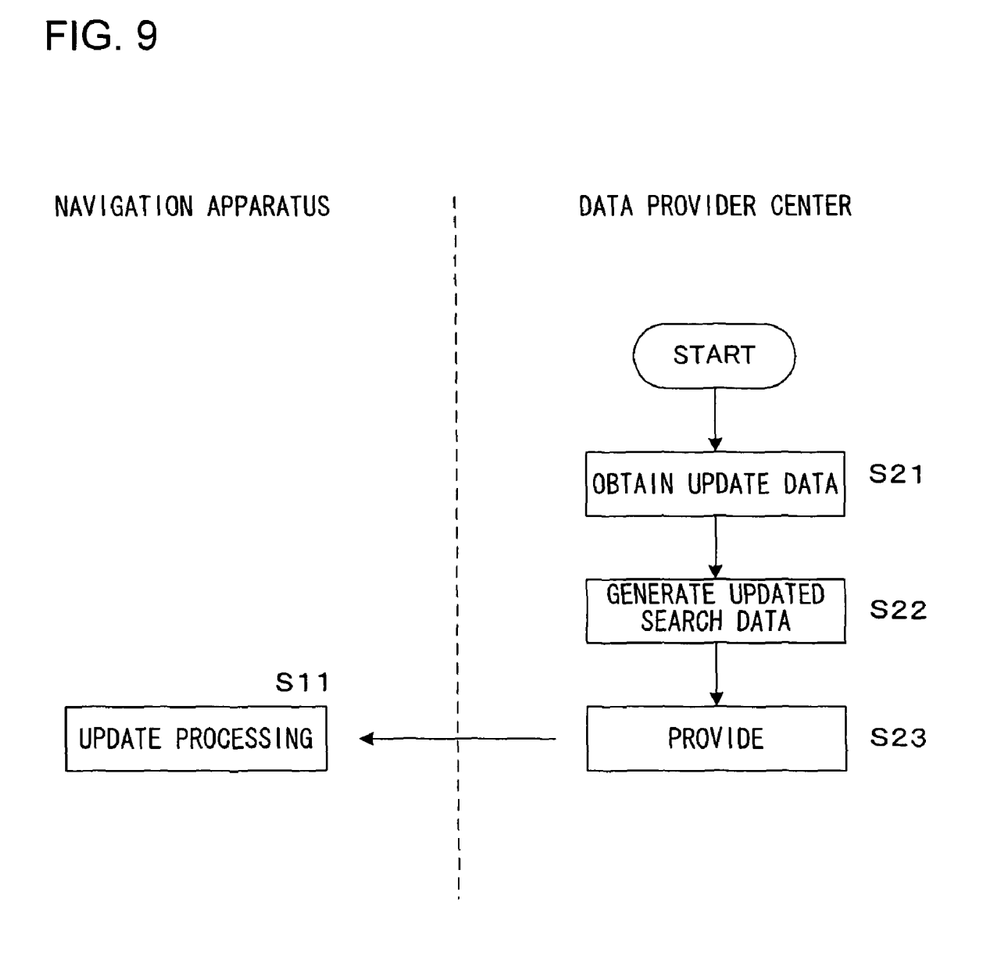
FIG. 9 shows the processing in the data provider center 9 and the information exchange between the navigation apparatus 1 and the data provider center 9, executed when updating search data.

FIG. 9 shows the processing at the data provider center 9 and the information exchange between the navigation apparatus 1 and the data provider center 9, executed as search data are updated. The processing at the navigation apparatus 1 is executed by the control device 11 in conformance to a specific program. The processing in the data provider center 9 is executed by the server 6 in conformance to a specific program.

The processing at the server 6 is started up as it becomes necessary to update search data. It is assumed that the type of search data to be updated, the filename of the search data file to undergo the update and the like are already specified. In step S21, update data to be used to update the update target search data are obtained. The update data may be input by an operator through a keyboard or update data having been generated separately may be read.

In step S22, the search tree data and the substance data in the update target search data are updated based upon the update data having been obtained in step S21. The substance data are updated by adopting a road shape element inherent number assignment system identical to the road shape element inherent number assignment system adopted in conjunction with the pre-update search data, and updated search data adopting the data structure explained earlier are generated.

In step S23, the updated search data are provided to the navigation apparatus 1. More specifically, a line connection is established via the communication device (not shown) at the data provider center 9, the telephone network 5 and the communication device 4 at the navigation apparatus 1 and the search data are provided through the line connection thus established.

Upon determining that the update searched data have been provided by the data provider center 9, the control device 11 at the navigation apparatus 1 receives the data and executes search data update processing in the navigation apparatus 1 in step S11. More specifically, the control device 11 rewrites the file with the corresponding filename.

At this time, the inherent number correspondence table 22 in the navigation apparatus 1 is not updated. Namely, if only the search data have been updated without updating map data, the pre-update inherent number correspondence table 22 is continuously used. If, on the other hand, map data are updated, the inherent number correspondence table 22, too, is concurrently updated, since the update may result in a change in the correspondence between the road shape elements and the links in the map data.

It is to be noted that an explanation is given above on an example in which the navigation apparatus 1 is simply provided with updated search data by the data provider center 9. Instead, a search data update request originating from the navigation apparatus 1 may be transmitted to the data provider center 9 and the data provider center 9, in turn, may provide the update search data as required. In such a case, the update processing should start as a menu "update search data" is selected in a menu screen or the like at the navigation apparatus 1.

The following advantages are achieved in the search data update system explained above.

(1) Universal (or permanent) road shape element inherent numbers are assigned to indicate individual shape element units (road units) constituting the actual roads and the correspondence between the search data and the map data is managed through the use of the road shape element inherent numbers. As a result, efficient, reliable and accurate correspondence between the search data and the map data is assured. This, in turn, allows the search data and the map data to be updated independently of each other with a high level of freedom. The search data in particular should be updated constantly since search targets continually change. Accordingly, by assuming the structure described above, the search data can be updated freely, regardless of the update status of the map data.

(2) The correspondence between the search data and the map data is regulated via the inherent number correspondence table 22 and thus, efficient, reliable and accurate correspondence can be sustained through a simple structure.

(3) When search data alone have been updated without updating the map data, the pre-update inherent number correspondence table 22 is continuously used. As a result, the correspondence between the updated search data and the map data that have not been updated can be maintained with ease and reliability.

(4) When map data are updated to result in a link change, the inherent number correspondence table 22 can be simply updated as the map data are updated, without having to update the search data. Namely, the update data can be kept to the smallest possible volume since only the data that need to be updated is updated.

(5) The use of road shape element inherent numbers reduces the volume of, in particular, map data, compared to the volume of map data required when universal inherent link IDs are assigned to all the links. In addition, compared to a navigation apparatus in which data indicating the correspondence between the new link IDs and the old link IDs must be saved every time data are updated, the navigation apparatus according to the present invention assures speedy processing that satisfies practical requirements since the data are handled simply and efficiently.

(6) Each record in the search data contains the normalized coordinate data of the coordinates for the link start point, the link middle point and the link end point of the link indicated by the link information, together with the road shape element inherent number. Thus, the correspondence of the directionality of the road shape element and the directionality of the link can be checked. As a result, even if the directionality of the road shape element and the directionality of the link are reversed from each other, i.e., even if the data arrangement is reversed, the POI position can be calculated accurately by taking into consideration the data arrangement reversal.

While an explanation is given above in reference to the embodiment on an example in which the navigation apparatus 1 and the data provider center 9 are connected via the telephone network 5, the present invention is not limited to this example and the navigation apparatus and the data provider center may be connected through another communication network (communication medium). For instance, they may be connected with each other via the Internet or via a dedicated line.

While an explanation is given above in reference to the embodiment on an example in which the updated search data are provided via a communication line (communication medium) in the telephone network 5, the present invention is not limited to this example. The updated search data may be provided in a recording medium such as a CD-ROM or a memory card.

While the search data are managed in units of individual files and are also updated in units of the individual files in the embodiment explained above, the present invention is not limited to this example. For instance, each file may be further divided into smaller units and the data update may be managed in these smaller units, instead. Namely, the search data may be managed in any units as long as they facilitate search data update management.

While the search data include the name search data, the telephone number search data and the street address search data in the example explained in reference to the embodiment, the present invention is not limited to this example and the search data may include another type of search data. Namely, the present invention may be adopted in conjunction with any type of search data as long as they are used to determine a specific position.

While the name search data in each category are provided as data files each created for an area unit, the telephone number search data are provided as data files each corresponding to a specific combination of numerals representing the first two digits in an area code and the street address search data are provided as data files each corresponding to an area unit in the example explained in reference to the embodiment, the present invention is not limited to this example and data files may be created in correspondence to units defined differently.

While an explanation is given above in reference to the embodiment on an example in which the coordinate data indicating the coordinates at the three points, i.e., the start point, the middle point and the end point of the link indicated by the link information are stored as the three-point coordinate data, coordinate data indicating the coordinates of the start point and the end point alone may be used. The correspondence of the directionality of the road shape element and the directionality of the link can be checked based upon two-point coordinate data as well. However, the directionality of a link that starts and ends at the same point cannot be determined without the coordinates of a middle point. In addition, coordinate data indicating the coordinates at more than three points may be used.

While an explanation is given above in reference to the embodiment on an example in which the DVD drive device 14 is installed at the navigation apparatus 1, the present invention is not limited to this example. The navigation apparatus 1 may include the nonvolatile memory 12 such as a hard disk alone, and may obtain map data and search data entirely through communication. In addition, the navigation apparatus 1 may include a slot for an IC card or the like and thus update data to be used to update search data may be provided in a removable memory such as an IC card.

While an explanation is given above in reference to the embodiment on an example in which the present invention is adopted in a navigation apparatus installed in a vehicle, the present invention is not limited to this example and may be adopted in a portable navigation apparatus. Furthermore, the present invention may be adopted in an apparatus other than a navigation apparatus. Namely, the present invention may be adopted in all types of apparatuses in which search data and map data, are used and managed in correspondence to each other. In other words, the present invention may be adopted in all types of apparatuses in which the position of a search target searched by using search data need to be correlated to a position on the map data.

While the programs executed in the navigation apparatus 1 and the server 6 are already installed in the respective apparatuses in the embodiment explained above, the present invention is not limited to this example. These programs may instead be provided via recording media such as DVD or CD-ROM. In such a case, the individual apparatuses will each need to be equipped with a device that reads the data from the recording medium. Alternatively, such programs may be provided via a transmission medium such as a communication network, a typical example of which is the Internet. Namely, the programs may each be transmitted as a signal on a carrier wave that carries a transmission medium. Furthermore, the navigation apparatus 1 in the data update system shown in FIG. 1 may receive the necessary program from the server 6.

While an explanation is given above in reference to the embodiment on an example in which the present invention is adopted in a dedicated navigation apparatus installed in a vehicle, the present invention is not limited to this example and the navigation apparatus may be embodied by executing the control program for the navigation apparatus 1 described above on a personal computer. In such a case, the current position detection device 13 and the like should be connected to specific I/O ports of the personal computer.

Figure 10:
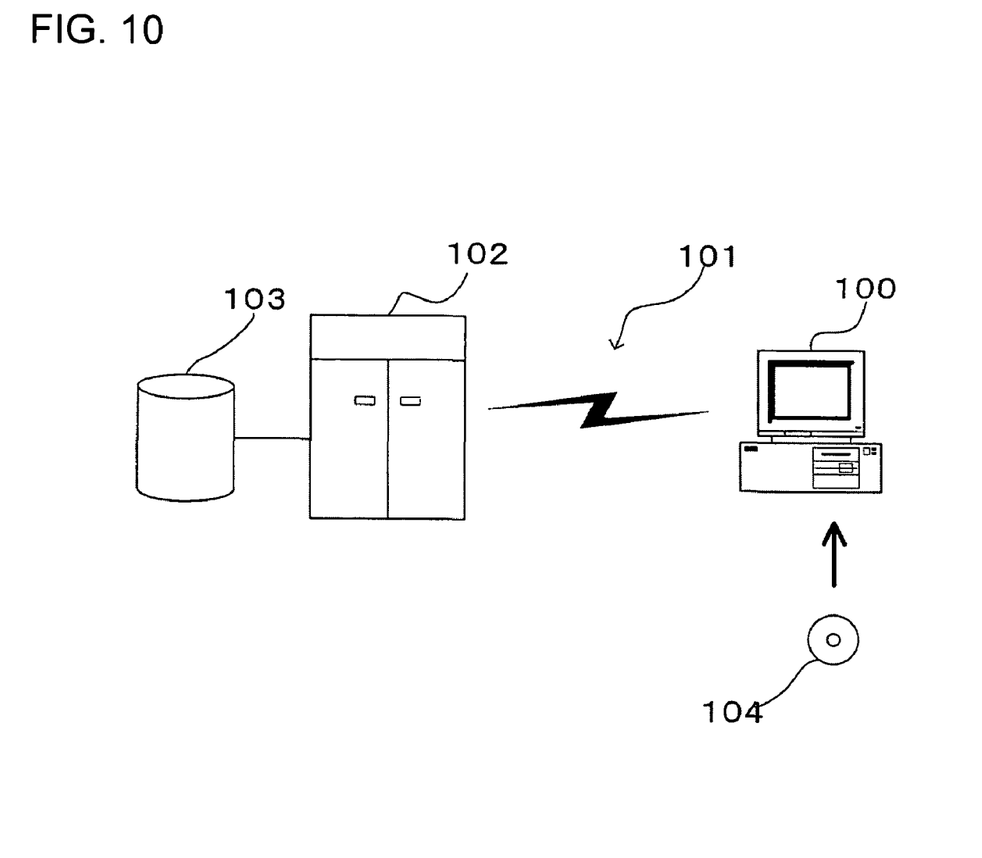

FIG. 10 shows how the program may be provided to a personal computer 100 in a recording medium such as a CD-ROM or through a data signal on the Internet or the like. While reference numeral 100 indicates a personal computer, the program may be provided to the navigation apparatus 1 or the server 6 in a similar manner. The personal computer 100 acquires the program via a CD-ROM 104. The personal computer 100 is also capable of connecting with a communication line 101. A computer 102 is a server computer that provides the program stored in a recording medium such as a hard disk 103. The communication line 101 may be a communication network for Internet communication, personal computer communication or the like or it may be a dedicated communication line. The computer 102 reads out the program from the hard disk 103 and transmits the program to the personal computer 100 via the communication line 101. Namely, the program embodied as a data signal on a carrier wave is transmitted via the communication line 101. Thus, the program can be distributed as a computer-readable computer program product adopting any of various modes including a recording medium and a carrier wave.

It should be noted that as mentioned above, the map data and the search also can be distributed as a computer-readable computer data product adopting any of various modes including a recording medium and a carrier wave.

While the invention has been particularly shown and described with respect to a preferred embodiment thereof by referring to the attached drawings, the present invention is not limited to this example and it will be understood by those skilled in the art that various changes in form and detail may be made therein without departing from the spirit, scope and teaching of the invention.

What is claimed is:

1. A navigation apparatus, comprising:
a map data obtaining unit that obtains map data;
a navigation processing unit that executes navigation processing by using the map data having been obtained;
a search data obtaining unit that obtains search data;
a specific data detection unit that detects specific data for a specified search target by using the search data having been obtained;
a correspondence table obtaining unit that obtains a correspondence table indicating correspondence between identification information used to identify individual road units into which each road is divided in predetermined units and map data road unit information related to map data road units defined in the map data individually corresponding to the road units; and
a map position determining unit that determines a position of the specified search target in the map data based upon the specific data for the specified search target having been detected and the correspondence table having been obtained, wherein:
the identification information includes road inherent information assigned permanently to each road unit to identify each road unit;
the specific data corresponding to each of various search targets, which are included in the search data, contain the identification information used to identify a road unit at which the search target is located; and
the map position determining unit obtains the map data road unit information from the correspondence table having been obtained, which corresponds to the identification information contained in the specific data for the specified search target having been detected, and identifies the map data road unit in the map data based upon the map data road unit information having been obtained.

2. A navigation apparatus, according to claim 1, wherein:
the specific data for each of various search targets, which are included in the search data, contain information related to positions of at least a start point and an end point of the map data road unit corresponding to the road unit, in addition to the identification information; and
the map position determining unit also determines the directionality of the map data road unit in the map data by using the information related to the positions of at least the start point and the end point contained in the specific data for the specified search target having been detected.

3. A navigation processing method comprising:
obtaining search data;
obtaining map data;
detecting specific data for a specified search target by using the search data having been obtained;
establishing a correspondence between the search data and the map data by using a correspondence table indicating correspondence between identification information used to identify individual road units into which each road is divided in predetermined units and map data road unit information related to map data road units defined in the map data individually corresponding to the road units; and
executing navigation processing by using the search data having been obtained, the map data having been obtained, and the correspondence having been established, wherein:

the identification information includes road inherent information assigned permanently to each road unit to identify each road unit;

the specific data corresponding to each of various search targets, which are included in the search data, contain the identification information used to identify a road unit at which the search target is located;

the map data road unit information, which corresponds to the identification information contained in the specific data for the specified search target having been detected, is obtained from the correspondence table; and the map data road unit is identified in the map data based upon the map data road unit information having been obtained.

4. A navigation apparatus according to claim 1, wherein:

the identification information does not change if the road does not change, even if search data is updated or the map data is updated.

5. A navigation apparatus according to claim 1, wherein:

the correspondence table is not updated if the map data is not updated, even if the search data is updated.

6. A navigation apparatus according to claim 5, wherein:

the correspondence table is updated if the map data is updated.

7. A navigation apparatus according to claim 1, wherein:

the specific data for the specified search target includes a set of the road inherent information corresponding to the road unit where the specified search target is located; and the map position determining unit obtains a set of the map data road information of the map data road unit corresponding to the set of road inherent information by referring to the correspondence table, and determines a position of the specified search target in the map data based upon the set of map data road information.

8. A navigation apparatus according to claim 7, wherein:

the specific data further includes house number information; and the map position determining unit determines a position of the specified search target in the map data based upon the set of map data road information and the house number information.

9. A navigation apparatus according to claim 1, wherein:

the map data road unit information includes map data road information assigned to each map data road unit to identify each map data road unit.

10. A navigation processing method according to claim 3, wherein:

the map data road unit information includes map data road information assigned to each map data road unit to identify each map data road unit.

\* \* \* \* \*